United States Patent

[11] 3,612,759

[72] Inventors Alfred M. Nelson
Redondo Beach;
Daniel J. Marshall, Torrance, both of Calif.

[21] Appl. No. 750,134
[22] Filed Aug. 5, 1968
[45] Patented Oct. 12, 1971
[73] Assignee The Magnavox Company
Torrance, Calif.

[54] THERMOMAGNETIC MOTION-PICTURE-RECORDING AND MAGNETOPTIC TV-REPRODUCING METHOD AND SYSTEM
32 Claims, 12 Drawing Figs.

[52] U.S. Cl. .......... 178/6.6 A, 178/5.2, 346/74 MT
[51] Int. Cl. .......... H04n 1/28, H04n 5/78, H04v 3/04
[50] Field of Search .......... 178/5.2, 6.6, 6.6 A; 340/174.1 MO; 346/74 MT

[56] References Cited

UNITED STATES PATENTS 2,953,633 9/1960 Hughes .......... 178/5.2
3,196,206 7/1965 Griffiths .......... 340/174.1
3,250,636 5/1966 Wilferth .......... 346/74

OTHER REFERENCES

Journal of Applied Physics Vol. 29, page 1003, June 1958 (Mayer Letter)

*Primary Examiner*—Bernard Konick
*Assistant Examiner*—J. Russell Goudeau
*Attorney*—Smyth, Roston & Pavitt

ABSTRACT: Audiovisual information such as a live scene or a motion picture film with soundtrack is converted into sequences of images each composed of incremental complementary, variable-size image areas used to provide a corresponding two-dimensional modulation of radiant energy. A black and white film is used as an intermediary and for defining the images of he sequence as variable area size, dark-light contrast patterns. The images are thermomagnetically copied on a low-Curie-point magnetic tape. The information on the tape is reproduced as by magneto-optical techniques, and the reproduced information is scanned, resulting in signals processed to control image reproduction as on the picture tube of a TV set.

INVENTORS
Alfred M. Nelson
Daniel J. Marshall
By Smyth, Roston & Pavitt
ATTORNEYS INVENTORS:
Alfred M. Nelson
Daniel J. Marshall
By Smyth, Roston & Pavitt
ATTORNEYS

THERMOMAGNETIC MOTION-PICTURE-RECORDING AND MAGNETOPTIC TV-REPRODUCING METHOD AND SYSTEM

The present invention relates to a method and system for recording and reproducing motion-picture-type information and to improvements pertinent therefore. The original information to be processed may be either a live scene or a black and white or color picture (which, in turn, may have originated from a live scene). This pictorial information will, in the following, be referred to as pictorial information, and the region or area defining such pictorial information is a polychromatic information field with the understanding that such information can or actually has been, but does not have to be, photographed or filmed on a black and white or color film.

A motion picture film can be reproduced in the home by a device establishing a closed circuit for TV reproduction, using a TV camera with film scanner, and a regular black and white and color TV set would then be connected thereto. Such a "-motion picture record player" is technically feasible but economically unfeasible for two reasons. First, the film, particularly color film, is very expensive initially but not reusable. After interest in the subject has been exhausted, it is an expensive unused item. The situation is quite different form reproduction of music. A recording of music may well be reproduced more or less frequently for a very long period after the record has been acquired. That will, in general, not be the case for video recording; after several showings, it may never be used again or after a long waiting period only. Second, the equipment for this type of record player is also too expensive because it requires a full record-reproduce system.

It is an object of the present invention to provide a method and system for the reproduction of recorded information, particularly motion pictures, or the like, in a TV set without requirement for photographic film as record carrier for the immediate, home production. Instead, the reproducing system permits utilization of an erasable tape as record carrier.

In accordance with the present invention the pictorial information is processed first to obtain a representation for a two-dimensionally modulated radiation field, the modulation being such that incremental areas within the contemplated two-dimensional radiation field have relative high radiation intensities, and the interlocking, in-between areas have relatively low radiation intensities. Such a two-dimensional radiation field must be made available for each motion-picture-type image frame to be produced for ultimate reproduction by a TV set as sequence of image frames. As a means for obtaining such two-dimensional radiation field, a black and white film is prepared in that it is exposed to the pictorial information. The exposure of the black and white film, or a copy step for copying images from this black and white film onto another one, is accompanied by the generation of an area-size modulation, for example, a line-width modulation.

The black and white film is exposed to exhibit a pattern of black (opaque) and white (transparent) areas; it is thus necessary to use a very "hard" Film. The essential aspect here is that the gray tone information represented, for example, as variable transmittance of an original motion picture film, is converted into a pattern of opaque-clear areas. Opaque image structure elements are surrounded by clear image structure elements and vice versa. The gray tones are defined by the relative size of a clear area in relation to adjacent or surrounding opaque areas and vice versa. The geometric shape of the structure elements of the thus-transformed images are, per se, of no importance except that they should not be discernible in the ultimate reproduction. That would also be fulfilled if, for example, the structure elements composing the images in this manner were not visible upon reproducing the motion picture film itself as obtained. Image structure elements can be opaque dots on a clear background for the lighter gray tones changing into clear dots in an opaque background for darker gray tones. Alternatively a variable line-width pattern can be used.

It should be observed that a very "hard" film usually has a very fine grain but is very slow. Since time is not a critical factor for copying process a hard film can, in fact, be used. Furthermore, fine grain is desirable as this permits the line pattern to have a high grating constant. It should be observed further that the term "black and white" film is to be understood to encompass light-sensitive films, disregarding any color differentiation of which it may be capable.

In case the variable side areas are represented by variable-width lines, an intermediate gray tone is then represented as a very fine line pattern with alternating opaque and transparent lines of equal or unequal width. A dark image portion or image increment is represented still by the same type of lines, having, however, relatively wide opaque lines, the interspaced transparent lines being relatively thin or vanish altogether. For white image areas the relationship is reversed. The images are thus composed of interlocking opaque and transparent or clear image elements which, per se, should not be discernible, even if the individual frame is enlarged to the size of a normal TV screen viewed at the normal viewing distance for TV. The film will be provided additionally with a sound track, for example, a width-modulated track of crosswise extending, spaced, parallel segments constituting a carrier modulation. The predominant extension of these segments will preferably run parallel to the lines of the image line patterns.

The exposed (and, of course, developed) black and white film having the images as variable area-size modulation and together with a variable line-width soundtrack is now juxtaposed to a magnetic recording surface. The process described in the following can be designated as a "thermomagnetic" copy process wherein, in particular, optical contrast information is converted into a "magnetic image." Such a magnetic recording surface, for example, a tape, has a magnetizable layer with a low Curie point. For example, the predominant component in this layer may be chromium dioxide.

The magnetic record carrier is at first juxtaposed to the black and white film and subsequently subjected to a flash of radiant energy reaching the record carrier only through the transparent portions of the film. The transparent areas on the film will pass substantially all the radiant energy onto similarly shaped portions of the juxtaposed tape. The opaque areas of the film will block at least a substantial portion of the radiant energy. The radiant energy is metered so that tape increments juxtaposed to transparent areas on the film are heated up to or somewhat above the Curie point to render the respective tape increments paramagnetic. The respect adjacent, interspaced areas on the tape which are juxtaposed to opaque areas on the film remain below the Curie point. They may be heated to some extent, but must remain ferromagnetic. This, in turn, is a condition as to the degree of opaqueness required to inhibit the heating of respective tape areas above the Curie point. The energy dissipates quickly after decay of the radiant energy and the storage carrier reverts to the ferromagnetic state throughout.

The storage carrier is magnetized so that the magnetization exhibited by those areas which were temporarily paramagnetic differs from the magnetization exhibited by the respectively neighboring areas. For example, the storage carrier is uniformly magnetized prior to the copying procedure. During the copying procedure the magnetization is erased wherever the carrier becomes paramagnetic, but the magnetic layer areas juxtaposed to opaque areas on the film retain their initial magnetism. A magnetic field below room temperature coercivity is applied to the carrier particularly when the heated portions revert back to the ferromagnetic state to impart thereto a magnetization which is oriented differently from the erased magnetization retained at the respectively adjacent areas. The magnetic field does not affect the portions of the character which remained well below the Curie point temperature. Actually, it is sufficient in general, to heat the magnetic carrier by radiation through transparent film image portions, so that its coercivity drops below the below-room-temperature field. The thus affected areas will be remagnetized even without having become paramagnetic Thus, whenever an area of the carrier is heated above a particular temperature and a magnetic below-room-temperature coercivity field is applied to such an area, that area will be newly magnetized by that field if coercivity of that area has dropped below the strength of the field as applied. This includes the paramagnetic case where the particular temperature is the Curie point (or above).

The magnetic images thus provided have, as structure elements, areas of variable size with an area of particular magnetization being adjacent an area or areas of different magnetization, preferably having opposite magnetic orientation. There is then a magnetic image composed of small, interlocking magnetic image elements which are characterized by differing magnetization. In particular, the areas corresponding to opaque image elements on the juxtaposed black and white film have a magnetization wherein the magnetic axis is oriented in a particular direction; the complementary image areas corresponding to clear image elements on the juxtaposed black and white film have a magnetization wherein the magnetic axis is oriented, preferably opposite to the particular direction. The optical-thermomagnetic transfer process from black and white film onto magnetic tape is a two-dimensional recording process and the resulting magnetic record is a two-dimensional one, as represented by the fact that the image elements are variable-size areas. The concurrently copied soundtrack is established by variable-size areas having, for example, constant width and variable length as measured crosswise to the extension track and having one magnetization on a background including line-shaped areas for separation of oppositely oriented magnetization.

Additional magnetic copies can be provided in a similar manner from the black and white master film. Alternatively, one can use the first magnetic carrier as master and provide therefrom copies in the following manner: The unmagnetized tape about to receive a copy is heated up to the Curie point and brought into face-to-face contact with the master carrier while permitted to cool when in contact. During the cooling the magnetization of the master carrier will be copied into the copy carrier.

The magnetic storage carrier is read out using magneto-optic technique in that the area of the carrier having an image field magnetizes a thin layer having a low coercivity and contacting the magnetic carrier on one side. The other side of the thin layer exhibits the property of specular reflection. A linear polarized beam, when directed at an angle towards the specularly reflecting surface of the thin layer is reflected therefrom. Any ray of this beam where interacting for reflection with an incremental layer portion may have its plane of polarization rotated in accordance with the magnetization of the layer increment encountered by the beam. Direction and amplitude of the rotation depends on the direction of the magnetization.

It was found suitable to orient the various components of this process in that the magnetization on one or the other set of magnetic image area increments on the carrier rotates the plane of polarization of an incident beam in opposite directions and for equal angles. An analyzing filter observes the reflected beam and produces a contrasting illumination field similar to an illumination field produced when a regular light beam traverses the above-mentioned black and white film.

The illumination field resulting from the magneto-optic readout is preferably raster scanned, the scanning lines running orthogonal to the modulation line pattern originally established if the variable-size area modulation was established by variable-width lines. The resulting electrical scanning signals are processed to produce electrical signals suitable for controlling directly a TV picture tube. The soundtrack can be reproduced by a regular transducer providing a carrier signal in accordance with the line modulation, which carrier signal is amplitude modulated in accordance with the length of the lines.

One can see that the user of that part of the system devoted entirely to the TV reproduction will purchase only one or a few magnetic tapes as part of the initial equipment. For a new recording he may have one of the tapes erased and thermomagnetically a new "film" is copied onto the tape or he can exchange tapes. His used tape can readily be used otherwise. He thus does not purchase a new film, but at an appropriate place, his own tape receives new information.

The invention is particularly useful if color information is to be recorded and reproduced. For each frame of polychromatic information there are several, for example, three separate images provided for exposure of the black and white film. The first image is the unmodified polychromatic information which, when used to expose black and white film, establishes thereon a record of the brightness or luminance distribution, particularly in accordance with brightness contrasts in the polychromatic information field. The second image includes again the entire polychromatic information field, minus one primary color, for example, blue, and third image includes also the entire polychromatic information field, minus another primary color, for example, red. The second and third images on the film establish intensity records of what is usually called color difference or chrominance information. Inasmuch as all image information is reduced to variable area size black and white information, the transfer to a magnetic recording as well as the magneto-optic readout can be obtained in the same manner. Upon scanning the magneto-optically reproduced frames, separate signal trains are produced to obtain three signal trains to be used for controlling visual display of the polychromatic information; they can be used, for example, for the control of the color TV tube in which the polychromatic information is reproduced in accordance with the final step.

The color information can be recorded and will thus be reproduced at a lesser resolution than the luminance or brightness image, primarily for reasons of saving recording space. This is not a disadvantage because the color contrast resolution of the human eye is considerably less (about one-sixth) than the brightness contrast resolution.

The playback device for use in conjunction with a TV set involves only black and white pickup elements, including the magneto-optic readout device, two black-and-white-type scanning tubes and signal-processing circuitry. For the latter part, it is optional to what extent one can use the electronics in the TV set itself.

While the specification concludes with claims particularly pointing out and distantly claiming the subject matter which is regarded as the invention, it is believed that the invention, the objects and features of the invention, and further objects, features and advantages thereof will be better understood from the following description taken in connection with the accompanying drawings in which:

FIG. 1 illustrates in perspective view, but somewhat schematically, an optical system for converting a color information field into three black and white images and pictures, together with a system for providing a soundtrack;

FIG. 1*a* is an enlarged view of the mask 21 shown in FIG. 1;

FIG. 2 illustrates the format of the pictures obtained on a black and white film with the system shown in FIG. 1;

FIG. 2*a* is an enlarged view of the image elements comprising the picture shown in FIG. 2;

FIG. 2*b* is an enlarged view of a soundtrack element along a picture on the film;

FIG. 3 illustrates a film-tape, thermomagnetic copy station using the film (or a copy thereof) as obtained in the station shown in FIG. 1;

FIGS. 3*a* and 3*b* illustrate schematically the magnetic image of the film portions shown respectively in FIGS. 2*a* and 2*b* as obtained in the copy station shown in FIG. 3;

Figures 1, 1A, 2, 2A, 2B, 3, 3A, 3B:
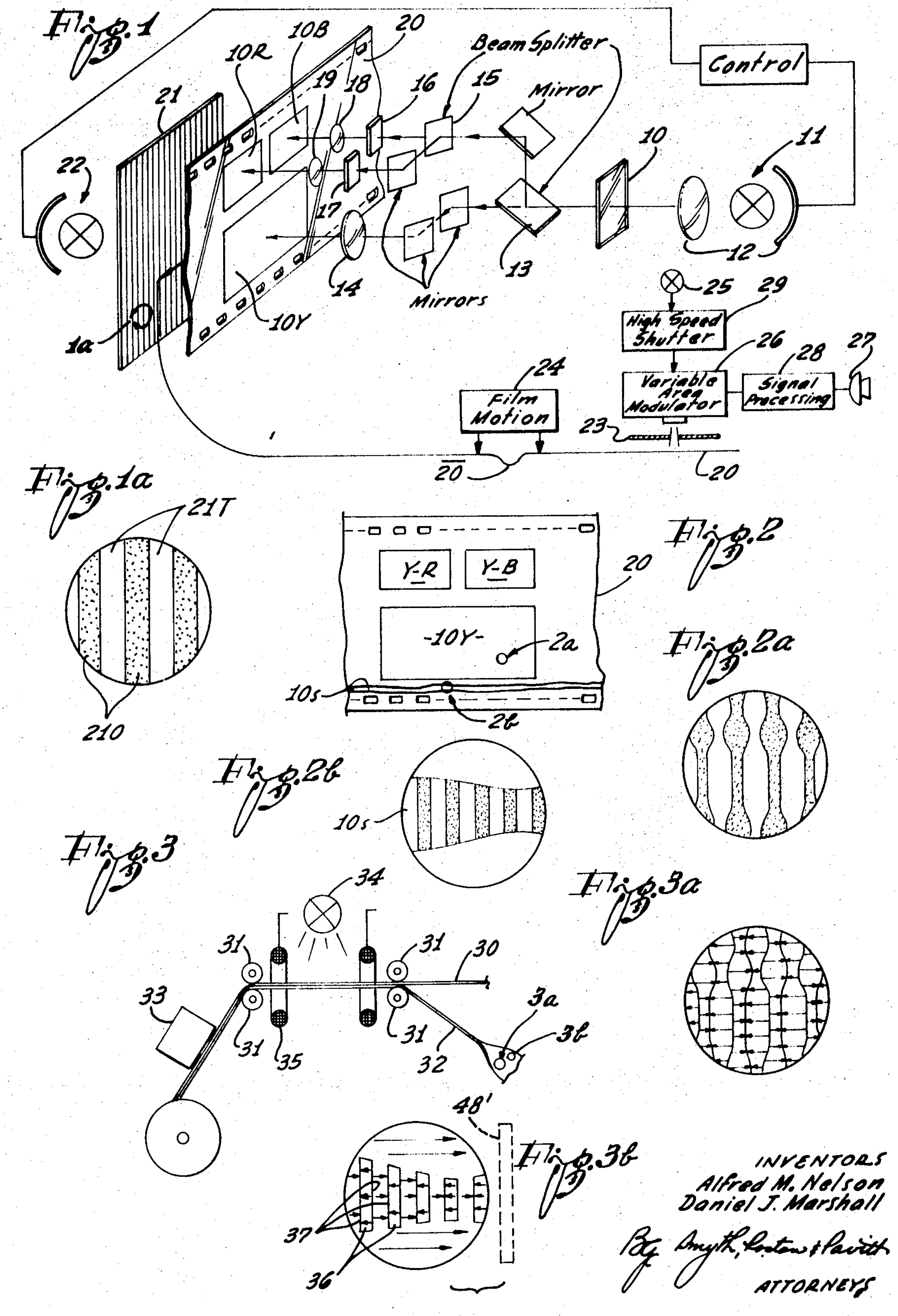

Proceeding now to the detailed description of the drawing, in FIG. 1 there is shown the first stage for the image-information-processing system and method in accordance with the present invention. In general, sequences of pictorial information are processed to obtain a representation thereof as a frame sequence. The frames are defined as picture representations each capable of producing a two-dimensionally, intensity-modulated radiation field. The modulation divides the radiation field into incremental regions where the resulting radiation is above a threshold interlocked with incremental regions where the resulting radiation is below that threshold and in accordance with a high-resolution, variable area size modulation pattern.

As a means which is capable of providing such radiation field, employment of a black and white film 20 is suggested. The black and white film is to be used as a mask in that discrete opaque areas block radiation of a radiation field, clear areas permit passage to obtain well-defined incremental radiation portions above and below a desired threshold. This film is prepared for exhibiting those capabilities in the station shown in FIG. 1. In order to show versatility of the system, it is presumed that the sequence of pictorial information to be represented by the black and white film is actually polychromatic image information. Thus, reference numeral 10 denotes, for example, one frame of a color film. In the general case this area 10 is to be a multicolor information field of view which may well be a live scene. In the present case it is assumed that element 10 is a color-contrast-producing single frame of a motion picture film, reeled through the station in a conventional manner and illuminated from the back of a lamp 11, so that the light beam emitted by the lamp is color and contrast modulated in accordance with the color information on the transparency 10. As stated, this is generally referred to here as a polychromatic information field.

Optical elements 12 provide for a collimated beam from lamp 11. A first beam splitter 13 is positioned in the path of the light modulated by the transparency 10. The beam splitter permits passage of a first portion of this modulated beam for observation by an imaging lens system 14. The transparency 10 is positioned in an object plane relative to lens system 14 which images transparency 10 onto a black and white film 20 as an image field 10Y. The field 10Y extends lengthwise instead across film 10, and field 10Y is smaller by about 33 percent than the normally available frame format on film 20.

The portion of the light beam not passed by beam splitter 13 to optic 14 is directed instead towards a second beam splitter 15 to be divided therein into two beams. These two beams are respectively passed through filters 16 and 17. Filter 16 eliminates essentially all red light from the beam passing through, and filter 17 eliminates essentially all blue light from the respective other beam. The two beams are respectively focused by two imaging systems 18 and 19 for respectively providing two images in side by side relationship onto the portion of film 20 located above the area on which is imaged field 10Y. These two additional image fields are denoted respectively with reference numerals 10R and 10B covering corresponding areas. Additional mirrors are provided to establish the spatial relationship among these three image areas and fields 10Y, 10B and 10R as is particularly illustrated in FIG. 2. The height and width of the two areas for image fields 10B and 10R are each half of the respective height and width of the area for image field 10Y.

For convenience of reference, the following terminology shall be used, following closely the terminology for color TV. The image field 10Y is the Y field, representing the brightness information included in the color transparency 10, but irrespective of color. Since filter 16 eliminates red, the information imparted upon an area as image field 10R is the Y–R field, representing brightness without the red component. Accordingly, the information imparted upon the area as image field 10B is the Y–B field, representing brightness without the blue component. Either area records brightness of the respective image fields only because film 20 is of the black and white type.

A mask 21 is provided behind film 20 which has a raster in form of a line pattern, which is defined, for example, by opaque, vertical lines 210, having interspaced transparent lines 21T of equal width. The term "lines" as used for the description of the raster and as to be used in an analogous manner below, does not denote lines in the strict, geometric sense, but denotes rectangular or strip areas having finite but narrow width in one direction and an elongated length in the orthogonal direction, the length-width dimensions being apart by several orders of magnitude on a normal metric scale. As distinguished therefrom, I shall speak occasionally of a centerline of such line-shaped area or strip and that centerline is to understood in the true geometric sense.

A second lamp 22 is positioned for illuminating the mask 21, and the light reaching film 20 is modulated by the raster pattern of mask. If lamp 22 has a finite aperture and if the raster mask is somewhat spaced from the photosensitive layer in film 20 through the mask 21 has a zigzag intensity modulation pattern in the horizontal, and no modulation along any vertical line. There will be peak intensities along vertical (true) lines registering with the centerline of each transparent area 21T of the raster 21; there will be minimum intensities along (true) vertical lines registering with the respective centerlines of the opaque area 210 in the raster 21. These light intensities are added to the light reaching the various areas of film 20 from the other side and by operation of the lens systems 14, 18 and 19.

It is presumed that the film 20 is very "hard," i.e., it has a very high "gamma" and does not, by itself, provide an appreciable gray scale. Thus, one can justifiably speak of exposed and nonexposed, or opaque and transparent film areas or area increments. There is a light intensity threshold or a narrow, threshold like intensity range separating intensities sufficing for exposure from intensities insufficient for exposure. For total light intensities reaching a film increment from both sides and still below the threshold no exposure results; for total intensities reaching a film increment and having value above the threshold there is full exposure of such area increment.

An area increment on film 20 may be exposed from one side to very little information light due to a dark image field increment on transparency 10 (or due to exclusive presence of a particular color filtered out by one of the filters). The biasing light reaching that area increment of the film from the other side, should then be insufficient to expose that area, even if the film area increment is aligned with a central region of a translucent strip 21T in mask 21. Conversely, a very bright image field increment should expose the corresponding incremental area on film 20 even if minimum biasing light reaches that incremental area. Exposure of any other incremental area of the film 20 thus depends on whether or not the light intensities reaching that incremental area from the two sides and when added together exceed the exposure threshold.

It follows from the foregoing that the several images on film 20 are represented by variable-width line patterns, as shown representatively in FIG. 2*a*, showing a portion of the black and white film after development. Bright areas of picture 10 results in wide, black (silver) lines which almost or do, in fact, merge. Dark areas of picture 10 do not cause exposure or only along very thin lines. Areas of picture 10 of intermediate brightness result in more-or-less wide, black lines or strips, separated by less-or-more wide transparent lines or strips. The line pattern is presumed to be beyond the resolution of the display device for the reproducing system of the image information as recorded. The grating constant of the raster 21 should just be compatible with the graininess of film. It is beneficial in this respect that film 20 should be "hard" as films of that type usually have a very fine grain.

The black and white film prepared as described will serve either as a master for a copy process to be described below, or for direct reproduction. In view of the fact that the system and method in accordance with the present invention is expected to be practiced generally for the preparation of a motion picture recording, it will be practical to provide the film also with the sound track.

The schematically illustrated film motion device 24 is presumed to provide intermittent motion to film 20 as it passes through the above-described photographing and image-processing station, and in a conventional manner. Representatively, it is presumed that his stepwise motion is imparted upon film 20 to the left of the motion device 24 as depicted in the drawing. In addition, the motion device 24 moves film continuously, for example, from payout reels, or the like, and establishes hereby particularly a loop 20 or feeds continuously out of the loop. Again, this portion of the apparatus is conventional as far as advancing a photographic film is concerned, and does not require elaboration.

Soundtrack increments and individual picture frames are usually not aligned along a motion picture film because the production of the former requires continuous motion, the reproduction of the latter requires intermittent motion and stopping, so that there is necessarily a physical separation of the respective reproduction devices for motion picture films and the respective recording devices have to be analogously spaced along the film accordingly.

Along the travel path of film 20 and at a location along which the film moves continuously, there is disposed a mask 23 defining a single, narrow slot which extends with its length crosswise to the extension of the film and over a small portion thereof equivalent to the width permitted for the soundtrack. The width of the gap in direction of motion defines the resolution of sound recording. The mask covers, additionally, all portions of the film onto which are recorded the images of frames 10R, 10B and 10Y. Light from a source 25 falls through the slot in mask 23 for providing soundtrack 10S (see FIG. 2). The light is modulated by a variable area modulator 26 of conventional design and controlled from a microphone 27 through a signal processor 28. Alternatively, an otherwise recorded soundtrack may be reproduced, and the reproduction signals may control the modulator 26. In addition, the light from source 25 is chopped by a high-speed shutter 29.

The result of this double modulation is depicted representatively in FIG. 2*b*. The soundtrack 10S is comprised of bars or strips extending crosswise to the extension of the sound track, and their progressively variable length represents the variable area modulation. The strips or bars will be opaque (after development of the film) on a transparent background and spaced apart by bar-shaped, transparent areas having width similar to the opaque strips. The opaque bars or strips result from exposure of the film through mask 23 when shutter 29 is open, the transparent spaces in between result from closure of the shutter. The length of the opaque bars or strips represents the area modulation as provided at the respective instant by modulator 26.

Shutter 29 may, for example, be an optical valve which is used here as an on-off device. The device can be modified in that the audio signal processor 28 controls directly the shutter, and the shutter frequency is varied in accordance with the signal amplitude. The resulting track on film 20 will then be defined by opaque bars or strips of constant length but of variable width, and the transparent spacings between respective two opaque strips will also vary so that the result is a frequency modulation as soundtrack recording.

In case transparency 10 is one frame of a color film which is already provided with the soundtrack, the soundtrack on film 10 may be photographed directly onto film 20 using the soundtrack on film 10 in lieu of modulator 26, with light from source 25 being constant frequency modulated by shutter 29, then by the soundtrack on film 10, and passing through the slot in mask 23 as aforedescribed. Still alternatively, the optical system 14 may have a somewhat larger aperture than necessary so that the imaged field of view includes the sound track for direct photographing thereof onto film 20. In this case the audio-recording device, described in the previous paragraphs, is not needed. An additional, light-dimming filter may have to be interposed here in the portion of the optical path for imaging the soundtrack, so that the imaging light for the soundtrack presumed to be area modulated cannot expose by itself the film 20 anywhere. The raster mask 21 has an extension so that raster-modulated light from source 22 reaches also that portion of film 20 provided for the soundtrack. The composite light from the transparent regions 21T and from the soundtrack on film 10 will expose film 20 to provide for track with a pattern as shown in FIG. 2*b*, This method of direct copying the soundtrack in longitudinal sections requires, however, great precision in the positioning of the two films to produce a continuous soundtrack without overlapping or interruption. It may thus be simpler, even in case a film is already provided with a soundtrack, to reproduce that soundtrack as electrical signals and to employ the modulating device 26, etc., responding to such signals for providing a new soundtrack in the desired format, or to use the soundtrack on film 10 in lieu of the modulator 26, as described.

Subsequently, the film 20 is developed as is usual for black and white films. The images representing the image fields 10Y, 10B and 10R thus represent in variable widths, black and white line patterns respectively, the overall brightness distribution of the color transparency 10, the minus blue and the minus red image information of that transparency. For multiple recordings, such as the recording of the several frames of a color film or of a progressively changing live scene, film 20 will be exposed to progressing frames accordingly, each such frame including three image areas corresponding to image fields 10Y, 10B and 10R. The sound track 10S runs along the sequential fringes of image frame triplets.

It should be noted that the implied color information included in the images of fields 10B and 10R has lesser resolution due to the smaller size of these areas when compared with area 10Y. There is no inherent necessity for this step, but this is permissible because the color resolution of the human eye is considerably below its brightness-contrast resolution. Thus, for a given recording space, it is advisable to use the predominant portion thereof for recording and storing the brightness contrasts at the highest resolution possible and reasonable in view of the ultimate resolution during final image reproduction on a TV screen.

Proceeding now to the description of FIG. 3, it shows the main recording station 30 in the system in accordance with the present invention. The film 20 prepared as described has as principle function to serve as a controlled radiation mask, and the station described with reference to FIG. 1 served exclusively as a means for preparing that "mask." FIG. 2*a* is a representation of the "controlled mask" aspect of the developed black and white film with the clear and opaque line pattern. This film 20 is reeled through a station 30 which comprises the following element.

A set of rollers 31 reel the film 20 into face-to-face contact with a portion of a magnetic tape 32, which is thus also reeled into the station. Tape 32 has a layer of magnetizable material having a rather low Curie point; for example, the tape 32 may have as predominant constituent, chromium dioxide with a Curie point of a few hundred degrees centigrade or even below 200° C. Film 20 and tape 31 are reeled into station 30 in a relative position to each other so that the developed, photographic emulsion of the film 20 is juxtapositioned and comes in direct face-to-face contact with the magnetizable layer of tape 31; the respective backing members of tape and film face away from each other accordingly. Care has to be taken that film and tape do not move relative to each other during reeling as this would be detrimental to the copying process to be described next. Moreover, any relative slippage would cause abrasion of the image-bearing layer of the film.

The station 30 includes a permanent magnet 33 which magnetizes tape 32 in a particular direction coinciding with the direction of motion of tape 32, which is also its longitudinal direction of extension. The tape will be magnetized by magnet 33 prior to contacting film 20. Subsequently, when a frame or several frames of film 20 are juxtaposed to a correspondingly dimensioned area of tape 32, tape and film may stop and a lamp 34 flashes.

The radiant energy provided by lamp 34 is collimated to define a rather uniform illumination field. Visibility of the light is only incidental. It is essential that the radiant energy employed can readily be absorbed by the opaque portions of film 20, and that is can also readily be absorbed by the magnetic tape to be converted therein into thermal energy. This light beam from lamp 34 passes first through transparent portions of film 20 and reaches particularly the magnetizable layer of tape 32 essentially along the transparent, line-shaped area of the variable-width line pattern on film 20. The opaque and complementarily variable-width lines on the film 20 block an essential portion of the light.

The intensity of this radiant energy is selected so that the energy reaching the magnetizable layer 32 through the transparent lines on film 20 suffices to render these particular and correspondingly variable-width, line-shaped areas on layer 32 paramagnetic, or at least to reduce the coercivity below a particular value. The respective adjacent areas of tape 32 facing opaque lines of film 20 of complementarily variable line width may be heated slightly but the temperature should remain well below the Curie point, and particularly their coercivity remains unaffected or at least above said particular value. It is this, the essential aspect of the two-dimensional recording step of the motion picture information: the individual frame is represented by a two-dimensional radiation field modulated in a variable area size pattern, wherein, representative of a first set of image forming elements, incremental radiation areas (where light passes unimpeded through the film) have intensities above a threshold level, viz., a level determining the reversion of the magnetic layer increment receiving that radiation dose to the paramagnetic state or at least reducing substantially its coercivity. The second set of interlocking, complementary, image-forming elements are represented by corresponding incremental radiation areas (where light is substantially blocked by dark, essentially opaque film portions) below that threshold, thus incapable of raising the temperature of the magnetic layer increment receiving that radiation closest to the paramagnetic state.

It should be noted that the line pattern may be generated in the the thermomagnetic copy station, as shown in the copending application Ser. No. 582,358, filed Sept. 27, 1966, now U.S. Pat. No. 3,512,170, by one of us and assigned to the same assignee. This can be understood as a transfer of mask 21 with light source 22 of FIG. 1 to the station shown in FIG. 3. However, the preparation of a black and white film having interlocking opaque and clear image elements as described is preferred, even though requiring an additional step, but quality control is facilitated.

The initial magnetization of tape 32 is erased wherever an incremental tape portion faces a transparent film increment, or at least its coercivity is reduced below room temperature, while along those portions of the tape 32 covered by opaque areas of film 20 the initial magnetization remains and the coercivity remains above a particular value. Since the lamp 34 is also a flashlamp with peak energies developed within a very short period of time, the total energy received by any tape portion is small and just suffice to render such a portion paramagnetic or weaken its coercivity. Due to thermal decay in all directions, the material will rapidly revert to the ferromagnetic state immediately following the decay of the light flash.

In addition, station 30 includes a pair of coils 35 imparting a weak magnetic field upon the tape area in contact with the film. This magnetic field has the following characteristics. First of all, it is directed opposite to the direction of magnetization imparted upon the tape 32 by the magnet 33. Next, the field strength is below room temperature coercivity of the material of tape 32, in particular its value defines the above-mentioned particular value for the coercivity below which the radiation must reduce temporarily the coercivity of the material so that this weak field can remagnetize the thus-affected areas. Therefore, the magnetic field will affect only those portions of tape 32 which have become paramagnetic, or where the coercivity has been reduced as stated. As long as these portions are paramagnetic, or have too high a coercivity, the dipoles therein cannot be permanently aligned with the axis of this weak magnetic field as provided by the coils 35. However, the field from the coils is constant and persists, particularly while the paramagnetic regions of tape 32 revert back to the ferromagnetic state; this is the minimum duration for which the magnetic field of coils 35 has to be effective. During this reversion to the ferromagnetic state, the dipole strength expands, random motion becomes increasingly inhibited, so that the dipoles align themselves with the magnetic field set up by coils 35.

The field strength as provided by coils 35 is below room temperature coercivity, but for temperatures slightly below the Curie point that field strength will be above the then-existing coercivity of the material having this almost-Curie-point temperature. When the temperature falls just below the Curie point, the thus affected portion of the tape will be magnetized at saturation. The saturation magnetization will not be destroyed as the temperature declines further. The dipole strength expands so that these regions become permanently magnetized at saturation, even at room temperature and even though the field set up by the coils 35 is not effective any more at room temperature. It follows that coils 35 can actually be permanently energized, as the resulting field will be ineffective anywhere before and shortly after the flashing of lamp 34.

The portions of the magnetic tape covered by opaque lines on film 20 are not demagnetized by the magnetic field of coils 35, because demagnetization requires a field strength comparable with the room temperature coercivity. Of course, the temperature in these areas will be raised somewhat, particularly because the dark lines on film 20 will not be completely opaque. However, the temperature of those portions of tape 32 will still not be accompanied by a drastic lowering of the coercivity and the field set up by the coils 35 must thus be below a possibly slightly reduced coercivity in areas of tape which should retain their initial magnetization as provided by magnet 33.

The film portion, which is representatively shown in FIG. **2*a* will produce a magnetization pattern as is shown in FIG. 3*a*. One can see, therefore, that there is a variable-width line pattern on the tape 32** with adjacent line-shaped areas alternating in the direction of magnetization. The magnetization in one direction represents relative brightness of an image area and the magnetization in the opposite direction represents relative darkness thereof. It is entirely arbitrary which magnetic field direction is being interpreted as representing the light image areas and which one represents the dark image areas. It is merely a matter of interpretation if one regards that image as a positive or a negative image.

The soundtrack is likewise magnetically imaged into the tape. There will be a background magnetization in one direction and constant width-variable length rectangles 36 of oppositely oriented magnetization to establish the soundtrack. The portion of the soundtrack on the film, as depicted in FIG. **2*b* will result in a magnetic image as shown in FIG. 3*b***.

Figures 4, 5, 6, 7:
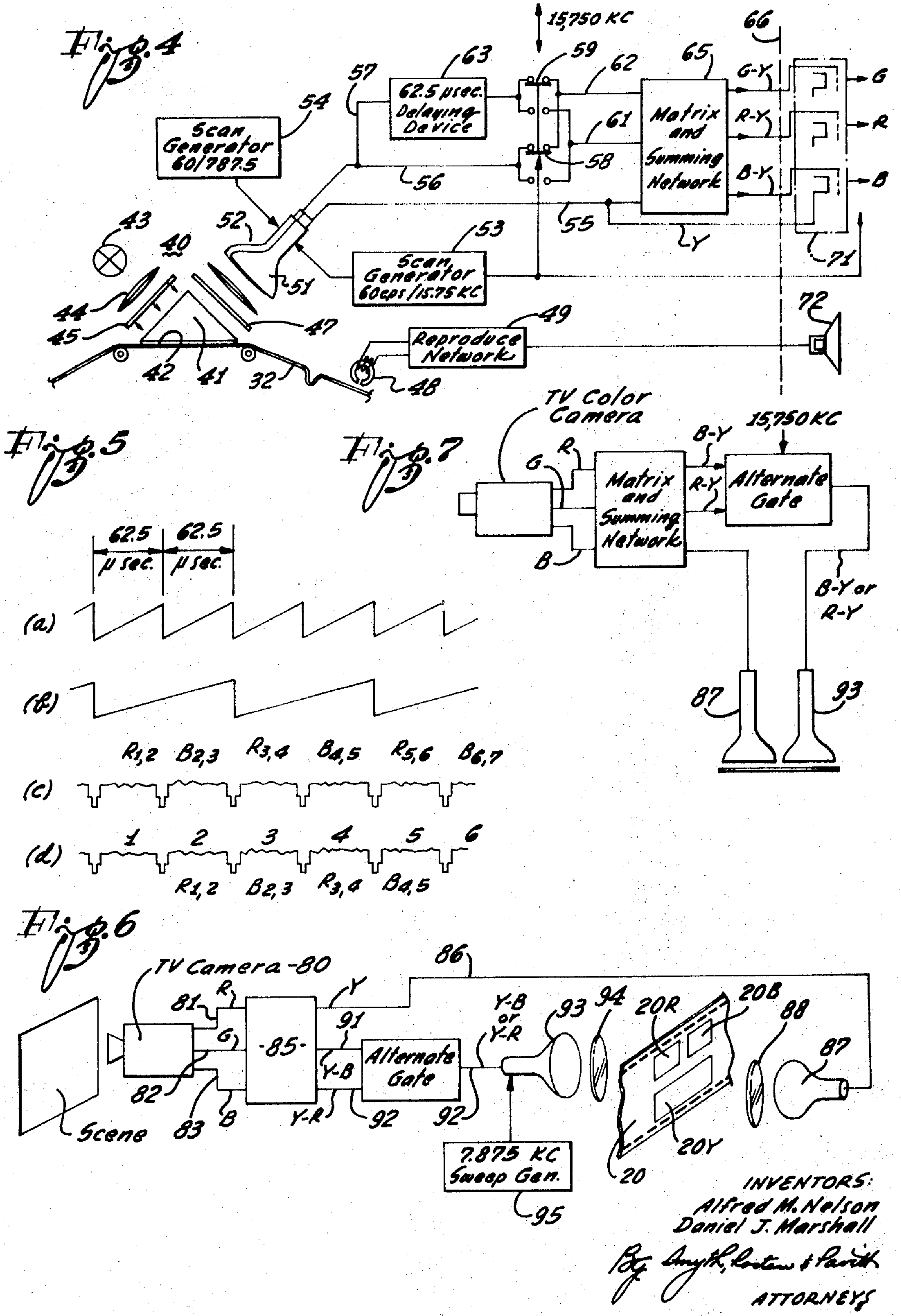
FIG. 4 illustrates schematically in side view and as block diagram a reproduce station for playback of the tape (or of a copy thereof) on which a magnetic image was provided in the station shown in FIG. 3.
FIG. 5 illustrates pertinent signals developed in the circuit shown in FIG. 4.
FIGS. 6 and 7 illustrate schematically alternatives to the station shown in FIG. 1.

In FIG. 4 is illustrated a magneto-optic readout station for reproduction of the two-dimensionally modulated image magnetization on the magnetic tape. This unit and associated circuitry can be described as a home video tape playback unit. The tape 32 (or a copy thereof) is passed alongside the base of a prism 41 which base is coated with a high-permeability, low-coercivity magnetic layer 42. The layer 42 is magnetized directly by and in accordance with the line-shaped magnetization pattern of tape 32. The interior surface of this layer 42 which is juxtaposed to the base proper of the prism 41 has highly specular reflecting properties. Actually, the layer 42 can be composed of a multiple-layer system for magneto-optic image enhancement, as, for example, described in U.S. Pat. No. 3,474,428, dated Oct. 21, 1969 of Alfred M. Nelson and Henry W. Griffiths and assigned to the assignee of this application.

The tape is now read out indirectly, by causing the magnetization in the layer 42 on tape 41 to control radiation using magneto-optic techniques. Light is directed from a light source 43 towards an optical collimating system 44, and the collimated beam is polarized in longitudinal direction by a polarizing filter 45. The orientation of the plane of polarization is preferably such that a ray within the beam of light reflected by the thin layer 42 will have its plane of polarization rotated in one direction or in the opposite one for respectively oppositely oriented, equal angles, depending on which one of the two directions of magnetization the ray encounters. Specifically, the direction of rotation depends on whether a light ray reaches a region layer 42 which is magnetized by a tape portion which received its magnetization from the coils 35, or by one which received its magnetization by magnet 33.

The reflected light is passed through an analyzing filter 47 oriented for minimum transmission of light polarized in a plane parallel to one of the planes defined as plane of polarization after rotation in one particular direction. Light having its plane of polarization rotated otherwise will be passed to a greater degree. Thus, the reflected beam, as a whole, obtains a noticeable contrast distribution. The contrast is again defined by alternating dark and light lines of variable widths. It is merely a matter of orientation of analyzer 47 whether the visible image now produced is a positive or a negative one.

The overall contrast field is imaged onto two television-camera-type pickup tubes 51 and 52. The two tubes observe different fields of view, but both are seen through analyzer 47. The tube 51 observes the light reflected by the magnetic image on the area corresponding to field 10Y (FIG. 2). The direction of line scanning is the direction of extension and propagation of tape 32 which is transverse to the line pattern of the information as it resulted from the orientation of the raster 21 (FIG. 1). The tube 52 observes and scans an area covered by the two magnetic images corresponding to image fields 10B and 10R. The scanning, as provided by tube 52 runs parallel to the scanning by tube 51.

The two tubes 51 and 52 are controlled differently. The deflection system in tube 51 is driven by a scan-signal generator 53 with a frame repetition rate of 60 c.p.s. and a line rate frequency of 15.75 kc. as is conventional for TV pictures The tube 52 is controlled from a generator 54 also having a frame repetition rate of 60 c.p.s. but a line rate frequency of half the regular line rate frequency which is 7.875 kc. FIG. *5a* illustrates the horizontal sweep signal provided by generator 53 to tube 51. FIG. *5b* illustrates the concurrently occurring sweep signal from generator 54 for tube 52. The figures show the two signals in their true phase relationship, the retrace of the sweep signal of generator 54 coincides with every other retrace of the sweep signal as provided by generator 53.

The electrical signals representing scanned image information and provided concurrently by the tubes 51 and 52 are depicted in FIGS. *5c* and *5d*, respectively. During any line scan period generator 53 causes tube 51 to scan one line, and tube 52 under control of generator 54 scans half of a line. However, due to the reduced size and due to the side-by-side positioning of the areas corresponding to image fields 10B and 10R, tube 52 provides, in fact, also a full image line, either of the fields 10B or of the field 10R and during each of the line scan periods of tube 51. Bearing this in mind, I shall proceed with the description of the processing of the output signals.

The output signal of tube 51 will in the following be called the Y signal, as it originates from the field 10Y. Moreover, this is the conventional designation of the signal representing the brightness and black and white contrasts of a color picture. This Y signal is now fed to a channel 55, which can be regarded as the brightness signal (Y) channel, and which could be reproduced in a black and white television set directly. Thus, for a black and white TV reproduction, no further measures would be needed, and this channel could directly connect to the electron beam control of a black and white TV picture tube.

The Y signal is depicted in FIG. *5c*, whereby the horizontal sync-pulses may not necessarily be a signal component resulting directly from image scanning. The sync-pulses may be added to the output signal of the tube 51 by the scan generator 53 and through appropriate signal adding as it is conventional. The formation of such a composite video signal is required only if the connections are made to employ the sync separator of the TV set in which the video information is to be reproduced ultimately. Otherwise, the unit 53 can be used directly to control the deflection system of the TV tube; this is schematically illustrated in FIG. 4.

The output signal of tube 52 is passed into a first channel 56, as well as into a second channel 57. This signal is depicted in FIG. *5d*. The labeling B and R alternatingly written above the several wave trains respectively identifies these signals as representing Y–B or Y–R signals depending on the time of presentation and in accordance with conventional designation. A switch 58, symbolically illustrated as an ordinary switch but being in effect an electronic switching device, alternatingly connects the channel 56 receiving the direct output signal from tube 52 to a channel 61 or to a channel 62. The switch is oscillated at the line scan rate for the tube 51 which is 15.75 Kc. For a period of 62.5 microseconds the channel 56 feeds channel 61 and for a succeeding period of 62.5 microseconds channel 56 feeds channel 62. Therefore, channel 61 receives only the Y–B signals produced at the 15.75-kc. rate by tube 52, while in the interspaced periods and when tube 52 produces the Y–R signal, that signal is supplied to channel 62.

The second channel 57 also receives the output of tube 52 and is connected to a delaying device 63. The delay period provided by delay device 63 is precisely 62.5 microseconds. The output of device 63 is passed alternatingly through an oscillating switch 59 to channel 62 and to channel 61. The two switches 58 and 59 are regarded as being ganged, so that they are cycled at the same rate of 15.57 kc. Accordingly, channel 61 receives the direct signals from channel 56 for a period of 62.5 microseconds while concurrently the channel 62 receives the output of the delaying device 63. In the succeeding period, having also a duration of 62.5 microseconds, channel 62 receives the direct signal from channel 56, while channel 61 receives the output of delaying device 63.

Channel 61 receives, therefore, a Y–B signal representing a particular scanning line, first directly from channel 56 and then the same signal again from the delay device 63. The same holds true for channel 62, receiving twice the same Y–R signal respectively for two sequential line scan periods at the 15.75-kc. rate. During the same two line periods of 62.5 microseconds each, channel 55 receives the Y signal for two sequential scanning lines of the Y image area (10Y on film 20). Each scanning line for the Y–R and Y–B images (fields 10R and 10B on film 20) covers a portion thereof having twice the relative width of the image portion covered by a scanning line for the 10Y fields if the scanning spots in the tubes 51 and 52 are of equal size and because the fields 10B and 10R have half the linear dimensions than field 10Y. Thus, the Y–B and Y–R signals represent a line-shaped image area equal to the relative width of two sequential lines in the Y signals. Accordingly, for each of the Y–B and of the Y–R signals covering a full line, there are needed sequential lines of the Y signal to cover corresponding image portions. These relationships are depicted symbolically in FIG. *5d* and *5c*.

The traces in the Y signal representing sequential lines are numbered 1, 2, 3, 4, 5, etc. For lines 1 and 2 in the Y signal, there is a corresponding single line in the Y–R signal labeled $R_{1,2}$. For lines 2 and 3 of the Y signal there is a Y–B signal labeled $B_{2,3}$. It should be noted that the Y–B signal produced in the second half of a line scan of tube 52 is vertically displaced by half a line width relative to the scan of the 10R and 10B fields. In general, scanning of the 10B field is delayed in the line for line scan by a period during which the scanner 52 has undergone a vertical deflection for about half a line width. Considering the relative size of the images this corresponds to a full-line vertical deflection in the Y image scanner 51. Thus, sequential half lines in the scan system for the 10B and 10R fields cover different pairs of lines for the 10Y field. The signal Y–B succeeding the signal $R_{1,2}$ is properly labeled $B_{2,3}$. The line $R_{1,2}$ covers an area corresponding to lines 1 and 2 of the Y scan, and line $B_{2,3}$, covers an area corresponding to lines 2 and 3 of the Y scan. Immediately succeeding is the next Y–R signal labeled $R_{3,4}$ followed by $B_{4,5}$, etc., whereby the subscripts denote corresponding line numbers of scanner 51.

The labeling written underneath the FIG. *5c* represents the delayed signal shown directly in FIG. *5d*. The delayed signals are merely represented by the line-identifying symbols $R_{1,2}$, $B_{1,2}$, etc. One can readily see that the phase shift for one line (63.5 microsecond) period as produced by the device 63 results in a particular relationship between the Y, Y–R and Y–B signals, as concurrently available in lines 55, 61 and 62. During the line period when the Y signal is the reproduced line 2 signal $B_{2,3}$ appears concurrently in channel 61 while in channel 62 there is the delayed signal $R_{1,2}$. The three signals compose the total amount of information passed concurrently through the channels 55, 61 and 62 during that second line period for the principal scan (Y). During the next line period (at the 15.75-kc. rate) the Y signal represents the scanning line 3, the Y–R signal is represented by the undelayed line $R_{3,4}$ and the Y–B signal is represented by the delayed line $B_{2,3}$, etc.

The three channels 55, 61 and 62 feed respectively the three signals Y, Y–B and Y–R to a matrix 65 to first establish Y–R and Y–B signals as are used in TV broadcasting. For this, a signal proportional to Y is first subtracted from Y–R and Y–B so that the resulting Y–R and Y–B signals are zero for colorless areas. The matrix 65 also establishes signals B–Y, R–Y and G–Y, the latter requiring all three inputs. These three signals are applied to the grid control of three electron guns 71, 72 and 73 while the channel 55 is directly connected to the interconnected cathodes of these electron guns, so that the output signals then respectively represent directly blue, green and red picture increments, permitting their reproduction on the screen of the color TV tube.

The dashed line 66 represents a symbolic line of division which separates the TV set from the tape reproduction unit. Elements shown to the left of line 66 will preferably be part of the tape reproduction device provided as a separate unit and having plugs or other suitable connectors for feeding the matrix output signals directly to the grid and cathode control circuit for the TV picture tube, circumventing the remaining electronics of the regular TV set. The picture tube in the regular color TV set reproduces then the tape.

The soundtrack could be read out or reproduced by magneto-optic techniques in general, however, it is not necessary to convert the magnetic image of the soundtrack into an optical image first and to convert that optical image into an electrical signal, subsequently, instead a regular transducer, such as transducer 48, can be used. The transducer is coupled to the tape at a location where the tape moves continuously into or out of the loop 32. The tape will move intermittently through the magneto-optic station as is conventional. The soundtrack is composed of rectangular areas 36 having magnetization in a longitudinal direction and being placed in a background field of oppositely directed magnetization. Each such area 36 has two parallel magnetic transitions or borders 37 where the magnetization reverses its direction. These borders 37 extend across the tape.

As tape 32 passes transducer 48, each magnetic border or transition 37 will produce a voltage excursion in the transducer, the direction and polarity of which depends on the direction of the magnetization before and after the border, for the particular direction of motion of tape and the amplitude of such voltage excursion depends on the relative length of a transition 37 in relation to the gap length of the transducer. Transducer gap 48' will be wider than or as wide as the maximum expected length of any of the rectangles 36 composing the track proper. The longer the rectangle 36 and the longer the corresponding borders 37, the stronger will be the signal in the transducer. Hence, the output of the transducer is an AM carrier having a frequency equal to the tape speed times the number of rectangles 36 per unit track length. The output signal of transducer 48 is demodulated and is amplified in a signal-processing unit 49 and passed to a loudspeaker 72 in which may be a component of the TV set.

If the audio track on the photographic film and/or the corresponding magnetic image thereof is frequency modulated as described above, then the transducer will produce an FM signal to be demodulated accordingly.

FIG. 6 illustrates an alternative for the station providing the black and white film. The system includes a TV color camera 80 for observing a live scene. The camera has, as symbolically denoted, three output channels 81, 82 and 83 respectively, representing red, green and blue image information. The signal will pass through a matrix network 85 to provide the Y signal which is a composite brightness signal for all three color components; the matrix further furnishes a Y–B signal and a Y–R signal. The Y signal is fed into a channel 86 to control directly the grid of an electron tube 87 having a conventional fluorescent screen for reproducing a regular black and white picture. The picture is imaged by a lens system 88 onto film 20. The picture is directly composed of image elements constituting a line pattern.

The intensity of the radiation emitted by the light spot on the screen of tube 87 has a Gaussian distribution. A line formed by the spot has, therefore, a variable amplitude but also a correspondingly variable width with regard to intensities above a given threshold. This line-width variation is not, per se, linearly related to the intensity, but can be made so by appropriate nonlinear intensity amplification. The film 20 is of the "hard" type and the threshold to which the intensity width modulation is referenced is the exposure threshold of the film, so that a wide, line-shaped area is exposed for a high intensity, a narrow line-shaped area is exposed for a low intensity. Thence, a variable-width line pattern is formed again on the film.

The two signals Y–B and Y–R are respectively provided to channels 91 and 92 and pass through an alternating gate of the type described above with reference to FIG. 4, of and 59) to control a single output channel 92. In alternating line scan periods at the 15.75-kc. rate channel 92 receives the Y–B or the Y–R information signals. This composite signal in channel 92 controls cathode or grid of an electron tube 93 having its horizontal deflection system controlled by a 7.875 sweep generator 95. During the first half of a full-line sweep generator 95 produces by a full line of the 10R image frame, and a full line of the 10B frame during the second half of a line scan for tube 93. The screen of tube 93 thus provides two black and white pictures in side-by-side relation. An optical system 94 images the two pictures on the portion on the film 20 above the image frame 10Y. The resulting geometric relation of the three image fields is then the same as shown in FIG. 2.

The film 20 is subsequently processed, copied, etc., as aforedescribed. There is, however, this difference in that the line pattern is horizontal rather than vertical. This may, in cases, result in an undesirable moire pattern. On the other hand, there is no need for the camera system 80 shown in FIG. 6 to operate with the usual horizontal scan. Thus, the line scanning may be carried out to form a vertical line pattern. In this case tube 93 will be scanned at the same rate as tube 87, which now can be any convenient rate. In this case, the two chrominance images are reproduced individually at frame rate, and blue and red signals appear in alternating frames. For a frame rate of 60 c.p.s. this is still well above noticeable flickering.

FIG. 7 illustrates an input system similar to the one shown in FIG. 6, except that the two tubes 87 and 93 are used to provide radiation directly to a magnetic tape 32 so that the radiation on the screen provides directly the erasing of magnetization as described above with reference to FIG. 3.

The invention is not limited to the embodiments described above but all changes and modifications thereof not constituting departures from the spirit and scope of the invention are intended to be covered by the following claims.

We claim:

1. The method of reproducing and displaying picture information on a screen, comprising the steps of:
 providing sequentially light beams modulated in accordance with motion-picture-type information in sequential frames;
 providing a motion of a black and white film in a first direction;
 recording the intensities of the sequential beams as sequential frames on a black and white film as modulation in areas extending in a second direction and having a variable width in the first direction;
 providing a thermomagnetic duplicate of the recorded images on the black and white film; and
 magneto-optically reproducing the magnetic recording for obtaining a visual reproduction of the sequential picture information.

2. A system for reproducing motion-picture-type information on a display tube, comprising:
 means for sequentially providing radiation fields representative of sequential picture frames, the fields each being comprised of interlocking pluralities of first and second incremental fields defined by the characteristics of being respectively above and below a threshold, the relative size of adjacent ones of the first and second incremental fields varying in accordance with local variations of characteristics of a picture frame definable as a local intensity variation;
 an elongated magnetic storage carrier progressively exposed to the sequentially provided radiation fields to become temporarily responsive to magnetization below room temperature coercivity where exposed to the first incremental fields of the pluralities and becoming unresponsive to such magnetization subsequent to the exposure, while remaining unresponsive to such magnetization where exposed to the second incremental fields of the pluralities;
 means magnetizing the carrier, so that the magnetization where exposed to the first incremental fields after reversion differs from the magnetization where exposed to the second incremental fields;
 magneto-optic means coupled to the carrier as magnetized by magnetizing means for providing optical contrast fields corresponding to the different magnetizations;
 signal means coupled to the magneto-optic means scanning the optical contrast field and providing an electrical signal representative thereof; and
 means connected to the signal means and including a display tube and a control circuit for controlling the visual display by the tube and being responsive to the electrical signal to obtain a visual reproduction of the sequential picture frames.

3. A system as set forth in claim 2, the local variations of characteristics of each picture frame include variations in brightness and chrominant components, the signal means including means for providing signal trains of different chrominant significance, the display tube being a color display tube.

4. A system for reproducing motion-picture-type information on a display tube, comprising:
 means for providing a movement of a photographic film in first direction;
 means for exposing the photographic film to the information and recording same in sequential frames, each having interlocking pluralities of essentially opaque and essentially clear image elements in accordance with a two-dimensional pattern, the essentially opaque and essentially clear elements extending in a second direction transverse to the first direction, the relative width in the direction of adjacent opaque and essentially clear image elements varying in accordance with local variations of characteristics of a picture frame definable as local contrast variation;
 a magnetic storage carrier coupled to progressive portions of the developed photographic film;
 means for irradiating the storage carrier through the photographic film where coupled to the carrier, radiation reaching the carrier through clear picture elements rendering the respective portion of the carrier temporarily responsive to magnetization below room temperature coercivity of the carrier, while becoming subsequently unresponsive again, respectively adjacent portions of the carrier remaining unresponsive to such magnetization during irradiation;
 means magnetizing the carrier so that the remanent magnetization of the carrier where having been rendered responsive to below room temperature coercivity magnetization differs from the magnetization of the carrier where remained unresponsive to such magnetization during exposure by the irradiating means;
 magneto-optic means coupled to the carrier as magnetized by magnetizing means, or to a copy thereof, for providing optical contrast fields corresponding to the different magnetizations;
 signal means coupled to the magneto-optical means scanning the optical contrast field and providing an electrical signal representative thereof; and
 means connected to the signal means and including a display tube and a control circuit for controlling the visual display by the tube and being responsive to the electrical signal to obtain a visual reproduction of the sequential picture frames.

5. A system as set forth in claim 4, the local variations of characteristics of each picture frame include variations in brightness and chrominant components, the signal means including means for providing signal trains of different chrominant significance, the display tube being a color display tube.

6. A system for obtaining recording and reproduction of pictorial information on a storage carrier, the combination comprising:
 first means for providing radiant energy to the storage carrier to heat the carrier above a particular temperature in first areas separated by second areas not heated above the particular temperature, and including means for providing controlled variations of the radiant energy to obtain local relative size variations in the first and second areas where the carrier is heated above the particular temperature and in accordance with sequential, picture information fields;
 second means coupled to the first means for obtaining the controlled variations of the radiant energy in accordance with the luminance of sequentially presented picture information fields;
 third means coupled to the carrier for magnetizing the carrier to obtain magnetization in the first areas which temporarily exceeded the particular temperature and a different magnetization in the second areas of the carrier, thereby defining magnetic images of the picture information fields; and
 means including a source of polarized radiation coupled to the magnetized carrier to magneto-optically produce optical contrast fields each representative of the first and second areas on the carrier, as defining the magnetic images of the picture information fields.

7. A device as set forth in claim 6, the first means including:
 a. means for providing on a black and white film photographic images of the information fields as provided by the second and third means and as variable line area side patterns wherein first and second interlocking areas respectively become opaque and clear incremental areas on the black and white film;
 b. means for positioning the black and white film and the carrier relative to each other; and
 c. means for providing radiant energy to the carrier through the transparent areas of the black and white film.

8. A system as set forth in claim 6, the particular temperature being the Curie point.

9. A system as set forth in claim 6, the third means including means for magnetizing the carrier at a field strength below room temperature coercivity but above the effective coercivity of the carrier at the particular temperature.

10. The method of motion-picture-type reproduction of pictorial information on a TV screen, comprising the steps of:

providing on a film dimensionally modulated image information representing sequential image frames where the modulations extend in areas in a first direction and have in a second direction variable widths representing such image information;

providing a movement of the film in the direction of the variable widths;

thermomagnetically copying the dimensionally modulated image information from the film on a low-Curie-point storage carrier to obtain the image information as size-modulated areas of particular magnetization interlocked with complementarily modulated areas of different magnetization;

magneto-optically reproducing the recorded information by providing progressing contrast fields of the differently magnetized areas;

scanning the optical contrast fields to obtain at least one scan signal train; and controlling a display tube in accordance with the scan signal train to obtain optical reproduction of the sequential image frames.

11. Method of providing the magnetic recording, comprising the steps of:

providing on a photographic film information in a format of a variable-size area pattern established by areas of alternating larger and lesser transparency, the alternation occurring in at least one dimension and extending in a first direction and having a variable width in a second direction transverse to the first direction in accordance with the information to be recorded;

positioning the film in optical relationship to a magnetic recording carrier of a relative low Curie point;

providing a coercivity field of insufficient strength to affect the magnetic recording carrier at ambient temperatures of the carrier but of sufficient strength to affect the carrier when the carrier is heated to the Curie point;

providing for a short period of time radiation to the carrier through the field at an intensity so that portions of the carrier optically aligned with areas of larger transparency become heated to the Curie point; and applying magnetization from the coercivity field to the carrier over areas larger than the areas defining the pattern so that the portions which become temporarily heated to the Curie point are magnetized differently after falling below the Curie point from the magnetization of the remaining potions which remained unresponsive.

12. The method as set forth in claim 11, wherein the step for providing an area pattern on film includes a step for controlling the width of lines establishing the area pattern along the extension of the lines in accordance with two-dimensional information fields.

13. The method, as set forth in claim 11, wherein the step for providing an area pattern includes a step for controlling the size of elongated areas defining the area pattern and extending crosswise to a track along which they are arranged.

14. The method as set forth in claim 13, wherein the step for controlling includes the providing of a signal train representing audio information.

15. The method as set forth in claim 11, wherein the step for providing as area pattern on the film includes a step for photographing a soundtrack onto the film and concurrently modulating the photographic image of the soundtrack to dissolve the image of the soundtrack into a sequence of variable-size contrasting areas.

16. The method as set forth in claim 11, wherein the step for providing an area pattern includes a step for photographing image information and a raster pattern onto the film.

17. The method as set forth in claim 16, wherein the photographing step includes subtractive color modulation of the light rays defining the image information.

18. The method of reproducing motion-picture-type information on a picture tube comprising the steps:

providing magnetic images representative of sequential motion picture frames as regular patterns of magnetic, variable-size areas upon a magnetizable storage carrier, adjacent areas of the pattern constituting image elements and having differently oriented magnetizations, the step for providing magnetic images including the providing of a variable-width line pattern and controlling the variable width in accordance with picture information, adjacent lines of the carrier obtaining different magnetization;

providing on the storage carrier a magnetization track of characteristically modulated areas in accordance with audio information;

scanning the variable magnetic patterns to provide at least one signal train representative thereof;

reproducing the track on the storage carrier;

producing audible signals representative of the audio information; and processing the signal train to obtain visible information on the picture tube.

19. The method as set forth in claim 18, the track providing step including the providing of discrete areas of alternating magnetization, the reproducing step including separation of a carrier frequency from the reproduced discrete areas magnetization as electrical signal.

20. The method as set forth in claim 18, the step for providing a track including providing of a variable-length constant-width line pattern and controlling the length variations along the track in accordance with audio information, the lines extending crosswise to the extension of the track as provided.

21. The method as set forth in claim 18, including the step of providing an optical contrast producing, variable-size-area-modulated, photographic replica of the motion picture frames; the magnetic-image-providing step including a thermomagnetic copying step of the photographic replica onto the magnetic carrier.

22. The method as set forth in claim 18, the scanning step including magneto-optically reproducing the magnetic images on the carrier and optic-electrically scanning the reproduced magnetic images to obtain the one signal train.

23. The method of reproducing a soundtrack on a photographic film comprising the steps of:

imaging the soundtrack onto the photographic film as alternating transparent-opaque strips of variable area size, the strips extending as to their respective long dimension transverse to the direction of the track they define;

providing a thermomagnetic copy of the strips to establish a track of magnetic strips of alternatingly directed magnetization;

reproducing the magnetic track to provide a modulated carrier signal; and demodulating the carrier for audible reproduction of the demodulation.

24. The method of reproducing a color film with soundtrack, comprising the steps of:

providing on a high contrast black and white film a variable-size area pattern of alternating opaque and transparent areas, the alternation to occur in at least one direction, defining a plurality of images of each color film frame, a first one of the images representing luminance of the color film frame, the second and third one of the images representing different chrominances of the color film frame;

providing on said film an image of the soundtrack as variable area size pattern, alternating opaque and transparent areas of the pattern extending along the track;

thermomagnetically copying the content of the black and white film onto a magnetic tape with opaque areas on the film being copied as a particular magnetization on the tape, transparent areas on the film copied as different magnetization thereon;

reproducing the video information on the magnetic tape to provide signals representing luminance and chrominance;

reproducing the audio information on the magnetic tape to provide signals representing the soundtrack on the tape;

processing the signals representing luminance and chrominance to obtain a polychromatic display corresponding to the picture of the color film; and processing the signals representing the soundtrack to provide audible information in accordance with the soundtrack on the color film.

25. The method of reproducing polychromatic information on the screen of a color display tube comprising the steps of:

providing a plurality a radiation fields representing the polychromatic information and having intensity modulations of different chrominant significance where the intensity modulations extend in successive areas in a first direction and have different widths in a second direction transverse to the first direction in accordance with variations in the polychromatic information and the intensity modulations of different chromatic significance;

thermomagnetically recording the plurality of radiation fields in a corresponding plurality of record frames in a particular magnetic pattern, the thermomagnetic recording including the initial application of a magnetic field in a first direction and the application of a weak magnetic field in a second direction different from the first direction to obtain the recording of the second magnetic field where the intensity modulations of the radiation field have particular characteristics;

magneto-optically reproducing the recordings and providing a plurality of optical contrast fields;

converting the optical contrast fields into three signals; and controlling a color display tube with these three signals to obtain a visible reproduction of the polychromatic information.

26. The method as set forth in claim 25, including the step of moving a photographic film in the second direction and exposing the photographic film to the light beams to obtain the modulations of variable width in the second direction of interlocking opaque and clear areas, the thermomagnetic recording step using the developed film as mark to obtain a magnetic image of the interlocking clear and opaque areas.

27. In a method of providing a magnetic recording of polychromatic information comprising the steps of:

providing a plurality of light beams of different chrominant significance;

exposing different areas of a high-contrast, black and white film respectively to said beams for providing images as variable line width patterns of alternating transparent and opaque lines;

developing the exposed film;

positioning a magnetizable storage carrier relative to the developed film;

providing radiant energy to the carrier through the film so that only energy reaching the carrier through the transparent variable-width lines of the film suffices to temporarily render the thus-affected portions of the carrier responsive to a below temperature coercivity magnetic field; and magnetizing the carrier so that the areas which were temporarily responsive and the areas which remained unresponsive are differently magnetized.

28. A playback device for providing signals for the control of a color picture tube and for reproducing image information on a magnetic storage carrier, the information being recorded on the carrier in a format wherein a color picture frame is represented by three recorded frames, the first frame containing recorded luminance, the second and third frames containing the intensity of two different components of the color picture, comprising:

magneto-optic means coupled to the carrier and providing optical contrast fields corresponding to the frames;

first means positioned to observe the optical contrast field corresponding to the first frame and providing a first line scan signal representative thereof; and second means positioned to observe the optical contrast fields corresponding to the second and third frames and producing second and third line scan signals respectively representative of the second and third frames.

29. A playback device as set forth in claim 28, comprising:

the first means as coupled to the carrier line scanning the first frame area at a particular rate and for providing a first output signal representative thereof;

the second means as coupled to the carrier line scanning the second and third frame areas at half the particular rate with the line-scanning signal always sweeping first over the second and subsequently over the third frame for each scanning line and producing a second output signal representative of the information of the second and third frames along the respective scanning line;

first, second and third signal channels, the first signal channel being coupled to the first means to receive said first output signal therefrom;

a first switch gate for alternating the coupling of the second scanning means directly to the second and third channels for respectively passing thereto the second output signal;

delay means having a delay time similar to the line scan period of the first scanning means and being coupled to the second scanning means for receiving therefrom the second output signal and delaying same by said delay time;

a second switch gate operating in synchronism with the first switch gate for alternatingly coupling the output of the delay means to the third and the second channel; and means coupled to the first and second switch gate for operating them for alternation at the line scan rate as provided for the first scanning means.

30. The method of reproducing picture information on the screen of a picture display tube, comprising the steps of:

providing sequentially light beams modulated in accordance with motion-picture-type information in sequential frames;

providing a movement of a black and white film in a first direction;

recording the intensities of the sequential beams as sequential frames on a black and white film where the intensities are recorded as successive areas in a direction transverse to the direction of movement of the film, the successive areas having variable widths in the direction of movement of the black and white film;

providing a thermomagnetic recording of the recorded images on the black and white film;

magneto-optically reproducing the magnetic recording and including the providing of sequential raster scan signals in accordance with sequential frames;

processing the scan signals for obtaining signals for controlling a picture display tube; and feeding the signals as obtained to the picture display tube control circuit for obtaining a visual reproduction of the sequential picture information on the screen of the picture tube.

31. A device for obtaining recording of polychromatic information on a magnetic storage carrier, the combination comprising:

first means for providing radiant energy to the storage carrier to heat the carrier above a particular temperature along first areas separated by second areas not heated above the particular temperature, and including means for providing controlled variations of the radiant energy to obtain local relative size variations in the first and second areas where the carrier is heated above the particular temperature;

second means coupled to the first means for obtaining the controlled variations of the radiant energy on a repetitive basis in accordance with the luminance of sequential polychromatic information frames and covering a first portion of the storage carrier for each such frame;

third means coupled to the first means for obtaining the controlled intensity variations of the radiant energy in accordance with at least one chrominance component of each of the polychromatic information frames covering a second portion of the storage carrier for each such frame; and means coupled to the carrier for magnetizing the carrier to obtain magnetization in the area which temporarily exceeded the particular temperature and a different magnetization in the remaining areas of the carrier, first and second portions of the carrier being oriented in relation to each other so that resulting recording of luminance and the one chrominance component of the same frame are recorded in physical proximity to each other.

32. A device as set forth in claim 31, the first means providing three information fields, each of which includes first and second areas, the first field to include the luminance, the second field defining the said chrominance component, the third field defining a second chrominance component of the polychromatic information different from the chrominance component for the second field.